United States Patent [19]

McKelvey et al.

[11] Patent Number: 5,412,168

[45] Date of Patent: May 2, 1995

[54] TOOL EYE/SETTER WITH IMPROVED MEAN TIME BETWEEN FAILURES CONSTRUCTION

[76] Inventors: Richard L. McKelvey, Rte. 6, Box 525, Joplin, Mo. 64801; Gary D. Hoofnagle, Rte. #4, Box 567A, Carthage, Mo. 64836

[21] Appl. No.: 60,856

[22] Filed: May 12, 1993

[51] Int. Cl.$^6$ .......................... G01B 7/00; H01H 3/16
[52] U.S. Cl. .................. 200/61.41; 73/865.8
[58] Field of Search ............. 200/61.41–61.43, 200/61.73, 61.74, 61.76, 61.78, 61.81, 17 R, 52 R; 33/201, 202, 549, 552, 556–561, 572; 73/865.8, 866.5, 104

[56] References Cited

U.S. PATENT DOCUMENTS

| | | | |
|---|---|---|---|
| 2,677,125 | 4/1954 | Pistoles | 340/265 |
| 2,822,436 | 2/1958 | Towle | 200/61.41 |
| 4,491,017 | 1/1985 | Iyer | 731/432.1 |
| 4,912,988 | 4/1990 | Matsuhashi | 731/865.8 |
| 4,924,715 | 5/1990 | Schaffer | 731/865.8 |

*Primary Examiner*—A. D. Pellinen
*Assistant Examiner*—Michael A. Friedhofer
*Attorney, Agent, or Firm*—Richard L. Miller

[57] ABSTRACT

A tool eye/setter comprising a sealed housing formed from a single piece. Sensor heads are mounted on the four faces of the upper portion of the housing. A shaft connects each sensor head with the inside of the housing. The shaft rests against a rod contact, which in turn rests against a knife contact. Pressure upon the sensor head causes inward motion on the shaft, which in turn pushes the rod contact away from the knife contact, breaking an electrical connection between the two. Rubber seals cover the shaft and portions of the sensor head that extend into the housing to prevent gas and fluid communication between the inside and outside of the housing. The absence of gas and fluid communication helps to prevent contaminants from getting into the housing and allows the housing to optionally hold an inert gas to prevent corrosion to the electrical contacts.

5 Claims, 1 Drawing Sheet

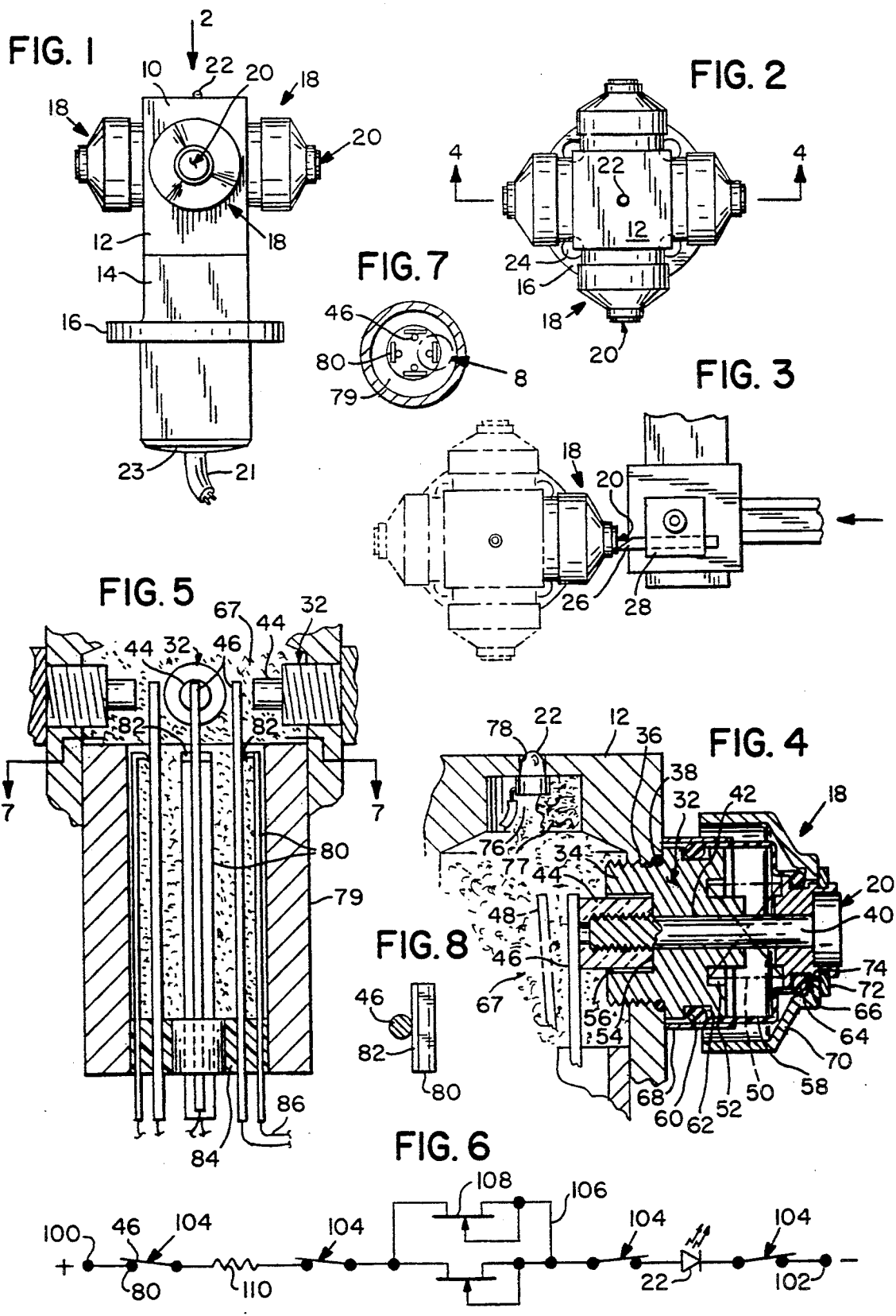

TOOL EYE/SETTER WITH IMPROVED MEAN TIME BETWEEN FAILURES CONSTRUCTION

BACKGROUND OF THE INVENTION

The invention relates to a tool eye/setter, for sensing contact with a tool bit.

In automated manufacturing, a computer numerical controlled machine (CNC machine) must know exactly where a tool bit is, so that it can properly interface with the workpiece. A tool bit used in a repetitive manufacturing process will experience continuous wear. If this wear is not compensated for, manufactured parts will begin to fall outside of acceptable tolerances. It then becomes desirable to gauge the wear of the tool bit. For that purpose, sensors are used which will ideally indicate the slightest contact with the tool bit, so that the CNC machine will continue to know the exact position of the cutting edge of the bit.

Many conventional sensors have a limited life. The short life of these sensors is caused in part by contaminants entering into the internal mechanisms of the sensors, and either corroding their mechanisms, or otherwise interfering with their operation.

U.S. Pat. No. 4,912,988 to Matsuhashi, discloses a sensor unit that converts an external linear contact to an internal rotary motion, which triggers a switch.

U.S. Pat. No. 4,924,715 to Schaffer, discloses a contact sensing system that employs a piezoelectric crystal for measuring the position of a workpiece.

U.S. Pat. No. 4,491,017 to Iyer, discloses a system for measuring minute dimensional changes in a polymer during polymerization.

While these units may be suitable for the particular purpose to which they address, or to general use, they would not be as suitable for the purpose of the present invention as hereafter described.

SUMMARY OF THE INVENTION

A primary object of the present invention is to provide a tool eye/setter that will overcome the shortcomings of the prior art devices.

It is an object of the invention to create a tool eye/setter that is seamless and sealed, to prevent outside contaminants for an improved mean time between failures.

It is a further object of the invention to create a tool eye/setter that is seamless and sealed, so that as a matter of design choice it can be optionally filled with an inert gas to reduce corrosion to its internal components.

It is another object of the invention to produce a tool eye/setter whose overall construction is for improving the mean time between failures.

It is a still further object of the invention to produce a tool eye/setter that is sensitive to a slight contact with a tool bit.

A still further object is to provide a tool eye/setter that is economical in cost to manufacture.

Further objects of the invention will appear as the description proceeds.

The tool eye/setter comprises a seamless and sealed housing, having four sensor heads on the upper portion of the housing. The mechanisms of the sensor heads are protected from contaminants by using rubber boots and O-rings, to prevent fluid and gas communication with the environment outside of the tool eye/setter. A slight pressure exerted on one of the sensor heads deflects an internal contact rod away from a knife contact, breaking electrical contact between the two.

To the accomplishment of the above and related objects, this invention may be embodied in the form illustrated in the accompanying drawings, attention being called to the fact, however, that the drawings are illustrative only and that changes may be made in the specific construction illustrated and described within the scope of the claims.

BRIEF DESCRIPTION OF THE DRAWINGS

In the drawings, like reference numerals depict like elements throughout the several views. The drawings are briefly described as follows:

FIG. 1 is a side elevational view of the instant invention.

FIG. 2 is a top elevational view taken in the direction of arrow 2 in FIG. 1.

FIG. 3 illustrates the instant invention in use in a typical application.

FIG. 4 is a diagrammatic cross sectional view with parts broken away taken on line 4—4 of FIG. 2.

FIG. 5 is a still further enlarged cross sectional view with parts broken away, illustrating the switch construction in greater detail.

FIG. 6 is an electrical schematic of the instant invention.

FIG. 7 is a reduced diagrammatic cross sectional view taken on line 7—7 of FIG. 5.

FIG. 8 is an enlargement of one switch contact in the area indicated by arrow 8 in FIG. 7.

DETAILED DESCRIPTION OF THE PREFERRED EMBODIMENT

A preferred embodiment of the tool eye/setter is shown in FIG. 1. The unit is contained in an integrated single piece housing 10. The housing can be constructed from a single piece of a cast metal, such as SAE 660 Brass. The housing has an upper portion 12 which has four faces, meeting at right angles—one face being in the plane of the drawing. The housing also has a lower portion 14, which is cylindrical. The diameter of the cylinder being inscribed within the square formed by the four faces of the upper portion 12. A mounting flange 16 encircles the lower portion 14, for mounting the sensor to a solid surface.

Sensor heads 18 are mounted on each face of the upper portion of the housing 12 for detecting contact with a tool bit 26. The sensor head has a sensor pad assembly 20, where the sensor actually comes in contact with the tool bit that is to trigger the sensor. The sensor pad assemblies 20 should be manufactured out of a hard, substantially non-deformable metal, so that repeated contacts to the sensor pad assembly 20 are translated to lateral movements of the sensor head 18, rather than deformation of the sensor pad assembly 20.

An indicator light typically an LED 22 is mounted at the top of the upper portion of the housing 12. The indicator light is normally lit while the sensor is powered. The indicator light 22 is extinguished when the sensor detects contact with a tool bit. A cable 21 extends from the bottom of the lower portion of the housing 14, to connect the tool eye/setter to a power source. Potting material 23 is used to seal the bottom of the lower portion of the housing 14.

In FIG. 2, the sensor is viewed in the direction of arrow 2 in FIG. 1. The indicator LED 22 is shown mounted in the center of the top of the upper portion of the housing 12. The sensor heads 18, and sensor pads assemblies 20 are shown as seen from above. The mounting flange 16 has mounting holes 24, through which screws or bolts can be used to fasten the sensor to a solid surface.

FIG. 3 demonstrates how the tool eye/setter is used. The sensor actuates when a tool bit 26, held by a tool bit holder 28, comes into contact with and exerts a slight pressure on the sensor pad assembly 20 of one of the sensor heads 18.

FIG. 4 shows the structure of the detecting mechanisms of the sensor. A sensor head plug 32 has a threaded neck 34, which extends into a threaded bore 36 in the upper portion of the housing 12. An O-ring 38, made of rubber, is used to create a seal between the sensor head plug 32 and the upper portion of the housing 12.

A shaft 40 extends through a shaft bore 42 in the sensor head plug 32. The shaft 40 has two ends. The first end terminates in the sensor pad assembly 20. The second end is threaded and extends into an insulated plunger 44, which rests against an electrically conducting contact rod 46. To ensure that the aforementioned sensing components are electrically insulated from the contact rod 46, the shaft, typically made of metal, does not extend the entire way through the insulated plunger 44.

A push upon the sensor pad assembly 20 is conveyed through the shaft 40 to the insulated plunger 44, which in turn pushes the contact rod 46 from its normal position as shown in FIG. 4 to the contact rod phantom position 48, which is also shown in FIG. 4.

A spring 50, indicated diagrammatically in FIG. 4, rests on one end against the sensor pad assembly 20 and against the sensor head plug, in a spring recess 52, on the other end. When sensor pad assembly 20 is pressed upon, the spring 50 is compressed. While the spring is compressed, it exerts a force against both the sensor head plug 32 and the sensor pad assembly 20. When the pressure upon the sensor pad assembly is removed, the spring 50 will push outward. Since the sensor head plug is fixed, the movable part, the sensor pad assembly 20 will be pushed outward. An end wall 54 in a plunger recess 56 in the sensor head plug, where the insulated plunger 44 is located, limits this outward movement so that the sensor head comes to rest in its original position.

A boot 58, preferably fabricated out of typically rubber, neoprene or other similar non-reactive material, covers the spring 50 and shaft 40. At one end of the boot, a first boot lip 60, extends around the sensor head plug 32 in a first boot recess 62. At the other end of the boot, a second boot lip 64 extends around the sensor pad assembly 20 in a second boot recess 66. The boot forms a seal around the mechanisms of the sensor head, to prevent gas or fluid communication between the outside of the tool eye/setter and the inside of the housing 10.

A ring 68 encircles the sensor head plug 32 where it extends outside of the upper portion of the housing 12. The ring 68 helps hold the boot 58 in position. A cover 70 helps protect the mechanisms in the sensor head from debris. The cover is held in position by a clip 72 mounted in a clip recess 74 in the sensor pad assembly 20.

The indicator LED 22 is mounted in an indicator LED recess 76 in the upper portion of the housing 12. A part of the indicator LED 22 extends through an indicator LED bore 78 in the upper portion of the housing 12.

The indicator LED recess 76 is filled with potting material 77, so as to prevent gas or fluid communication between the outside of the tool eye/setter and the inside of the housing 10.

It is highly desirable to eliminate gas and fluid communication between the inside and the outside of the tool eye/setter housing. One reason for this is to prevent contaminants from the work environment from corroding the mechanisms of the tool eye/setter, interfering with their operation, or otherwise cutting down the useful life of the tool eye/setter. Another reason is so that the tool eye/setter can be filled with an inert gas 67. A sealed tool eye/setter, filled with an inert gas 67 and then potted, will greatly enhance the useful life of the tool eye/setter by preventing oxidation of its components.

The electro-mechanical components are shown in FIG. 5. The contact rods 46 extend through an insulated cylinder 79, having an upper end and a lower end. Knife contacts 80 also extend through the insulated cylinder 79. The insulated plungers 44 are normally in close proximity to, or are resting against, the contact rods 46. The distance between the insulated plungers 44 and the contact rods 46 is exaggerated in FIG. 5. There are four sets of contact rods 46, knife contacts 80 and their associated hardware. Three are shown in FIG. 5, the fourth being part of the section removed in FIG. 5.

Each contact rod 46 rests against a sharp knife edge 82 on the knife contact 80 at the upper end of the insulated cylinder 79. The contact rods 46 are biased so that they exert a slight force upon the knife contact 80, making an electrical connection between the two. When the insulated plunger 44 is pushed against the contact rod 46 by virtue of contact to the sensor pad assembly 20 as previously described, the electrical connection between the contact rod 46 and knife contact 80 is broken. The contact rods 46 are also spring-like in nature so that when the insulated plunger 44 ceases to push them, the contact rods 46 will return to their original position, resting against the knife contacts 80.

Because of the relatively small contact surface of the knife edge 82, the electrical connection will be broken by a very small movement of the contact rod 46. Because of the length of the contact rod 46, which extends through the length of the insulated cylinder 79, the contact rod 46 never bends significantly. The relatively minor deformation of the contact rod 46 translates to greatly increased durability of the contact rod 46.

The contact rods 46 and knife contacts 80 extend through an insulated base ring 84 at the lower end of the insulated cylinder 79. The four knife contacts 80 are arranged in a circle toward the outer edges of the insulated base ring 84. The four contact rods 46 are also arranged in a circle on the insulated base ring 84, which is smaller in diameter, and inside the circle formed by the four knife contacts 80. Electrical connections 86 are made directly to the contact rods 46 and knife contacts 80.

An electrical schematic of the tool eye/setter is shown in FIG. 6. The tool eye/setter is connected to a power source having a positive node 100 and a negative node 102.

Four switches 104 are formed by the contact rods 46 and knife contacts 80. A current limiting device 106 is formed by connecting two n-channel JFETs 108 in parallel with their gates connected to the negative end.

Connected in series between the positive node 100 and the negative node 102 are: the four switches 104, the current limiting device 106, a resistor 110 and the indicator LED 22. Care should be taken that the negative end of the current limiting component 106 is connected toward the negative node 102, and that the indicating LED 22 is connected according to its polarization.

Since all four switches are connected in series, when any of the contacts are broken, the circuit is broken extinguishing the indicator LED 22 as a visual indication that contact with the tool bit has been detected. In a preferred embodiment, diodes manufactured under the name SILICONIX J511 are used for the n-channel JFETs 108, and the resistor 110 has a value of 22 ohms. This allows the tool eye/setter to safely operate when 3 to 48 volts DC are applied between the positive node 100 and negative node 102.

The tool eye/setter as connected in the embodiments shown, merely extinguishes a normally lit LED when contact with a tool bit is connected. It should be apparent to those skilled in the art how a microprocessor can be connected to the tool eye/setter to allow its use in an automated manufacturing application.

FIG. 7 is a section view detailing the arrangement of the four sets of contact rods 46 and knife contacts 80 arranged in a circle in the insulated cylinder 79.

FIG. 8 is a detail as indicated by arrow 8 in FIG. 7. The knife contact extends vertically through the insulated cylinder, which is the portion of the knife contact indicated by the hidden line in FIG. 8. The knife contact 80 has a horizontal portion, which terminates with a sharp knife edge 82 which is tapered. The contact rod 46 rests against the knife edge 82. The structure of the knife contact is also seen in FIG. 5, as previously indicated.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A tool eye/setter for a computer numerically controlled machine tool of a type comprising:
    a columnar housing block formed with an axially extending cavity and a ring of bores extending radially of and in communication with the cavity;
    plurality of sensor heads having respective shafts and mounted on the housing in respective bores so that a respective shaft moves inward into the housing cavity when pressure is applied by a tool bit to a respective sensor head; and
    at least one switch means, having two contacts, mounted within the housing and actuated by inward movement of a shaft, the improvement residing in that the said at least one switch means comprises:
    a plurality of knife contact members mounted inside the housing as a ring and comprising respective arms having respective lead connecting ends anchored in the cavity at a location remote from the respective sensor heads and the respective arms extending axially along the cavity adjacent and spaced from an inner wall surface thereof to locations adjacent and spaced longitudinally from respective, shafts and having respective opposite ends formed as inward extending knife contacts,
    and a plurality of resilient rod contact members mounted inside the housing in a ring and comprising respective lead connecting ends anchored in the cavity at a location remote from the respective sensor heads and the respective rod contact members extending axially along the cavity in side by side relation with and spaced inward of respective knife contact members with respective opposite free ends of respective rod contact members radially aligned with respective shafts and biased so that contact portions of respective rod contact members adjacent the free ends engage respective knife contacts to form respective electrical connections therewith, with respective free ends of respective rod contact members being engageable by an inward movement of respective shafts to break the electrical connections between the respective rod contacts and the respective knife contacts, the respective contact portions being much closer to the free ends that to the anchored lead connecting portions to that only a small deflection of the rod contact members is necessary to break the electrical connection with the knife contact so that the rod contact will endure repeated operation, and
    boots covering the respective shafts for preventing gas and fluid communication between the inside and outside of the housing.

2. The apparatus as recited in claim 1, further comprising an O-ring, for preventing gas and fluid communication between the inside and outside of the housing through the bore.

3. The apparatus as recited in claim 2, further comprising an inert gas, sealed within the housing, for preventing corrosion of the switch mechanism.

4. The apparatus as recited in claim 3, further comprising an indicator LED, normally lit, extinguishing when the electrical connection between the rod contact portion and knife contact is broken.

5. The apparatus as recited in claim 1, further comprising a spring, compressible by an inward movement of the shaft, so that when force causing the inward motion of the shaft is removed, the shaft will return to the position it was in prior to the inward motion of the shaft, so that the rod contact will return to rest against the knife contact to once again form an electrical connection with the knife contact.

* * * * *